(12) United States Patent
Nishida et al.

(10) Patent No.: US 11,492,058 B2
(45) Date of Patent: Nov. 8, 2022

(54) GRAB RAIL OF SADDLE RIDING VEHICLE

(71) Applicant: HONDA MOTOR CO., LTD., Tokyo (JP)

(72) Inventors: Yoichi Nishida, Wako (JP); Takehiko Kikuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 547 days.

(21) Appl. No.: 16/597,054

(22) Filed: Oct. 9, 2019

(65) Prior Publication Data

US 2020/0164939 A1    May 28, 2020

(30) Foreign Application Priority Data

Nov. 28, 2018 (JP) .............................. JP2018-221961

(51) Int. Cl.
*B62J 1/28* (2006.01)
*B62K 19/30* (2006.01)

(52) U.S. Cl.
CPC ....................... *B62J 1/28* (2013.01)

(58) Field of Classification Search
CPC .............. B62J 25/08; B62J 1/28; B62K 19/20
See application file for complete search history.

(56) References Cited

U.S. PATENT DOCUMENTS

2021/0001944 A1*  1/2021  Katagiri .................. G01S 15/93

FOREIGN PATENT DOCUMENTS

| CN | 1798679 A | 7/2006 | |
| CN | 103802941 A | 5/2014 | |
| DE | 102015217211 A1 | 3/2017 | |
| EP | 3590804 A1 * | 1/2020 | ............... B62J 1/12 |
| EP | 3964431 A1 * | 3/2022 | |
| JP | S61-072486 | 5/1986 | |
| WO | 2005/002954 | 1/2005 | |
| WO | WO-2015151575 A1 * | 10/2015 | ............... B62J 7/04 |

OTHER PUBLICATIONS

Chinese Office Action dated May 28, 2021, 7 pages.
Japanese Office Action dated Jun. 30, 2020, English translation included, 11 pages.
Indian Office Action dated Oct. 26, 2021, 6 pages.
Chinese Office Action dated Jan. 5, 2021, 9 pages.

* cited by examiner

*Primary Examiner* — Sarah B McPartlin
(74) *Attorney, Agent, or Firm* — Rankin, Hill & Clark LLP

(57) ABSTRACT

A grab rail of a saddle riding vehicle is secured to a rear portion of a body frame. The grab rail includes: a grip that extends in a vehicle longitudinal direction; a grip extension that extends downward from a front end of the grip; a front side fixation portion that is connected to a lower end of the grip extension and is attached to the body frame; and a coupler that couples the grip extension and the front side fixation portion. The grab rail includes a luggage hook that is formed by an opening. The opening is defined by the grip extension, the front side fixation portion and the coupler.

9 Claims, 7 Drawing Sheets

GRAB RAIL OF SADDLE RIDING VEHICLE

INCORPORATION BY REFERENCE

The present application claims priority under 35 U.S.C. § 119 to Japanese Patent Application No. 2018-221961 filed on Nov. 28, 2018. The content of the application is incorporated herein by reference in its entirety.

TECHNICAL FIELD

The present invention relates to a grab rail of a saddle riding vehicle.

BACKGROUND ART

In conventional grab rails of saddle riding vehicles in which the grab rail is secured to a rear portion of a body frame, some grab rails are known which integrally include a luggage hook protruding in one direction (see e.g., Patent Literature 1).

CITATION LIST

Patent Literature

[Patent Literature 1] Japanese Unexamined Utility Model Application Publication No. S61-72486

SUMMARY OF INVENTION

Technical Problem

However, in such a conventional grab rail, because the luggage hook has a protrusion shape projecting in one direction, although rope or the like is easily hooked in the luggage hook, if the rope or the like comes loose, the rope or the like may possibly fall out of the luggage hook.

The present invention has been achieved in view of the above-mentioned circumstances, and it is an object thereof to provide satisfactory securing of a fixing item such as rope or the like to a luggage hook in a grab rail of a saddle riding vehicle.

Solution to Problem

A grab rail of a saddle riding vehicle is provided. The grab rail of the saddle riding vehicle is secured to a rear portion of a body frame (10), in which the grab rail (50) includes: a grip (51) that extends in a vehicle longitudinal direction; a grip extension (60) that extends downward from a front end of the grip (51); a front side fixation portion (61) that is connected to a lower end of the grip extension (60) and is attached to the body frame (10); and a coupler (62) that couples the grip extension (60) and the front side fixation portion (61) to each other. The grab rail (50) includes a luggage hook (70) that is formed by an opening (65). The opening (65) is defined by the grip extension (60), the front side fixation portion (61) and the coupler (62).

Further, in the above configuration, the coupler (62) may be situated further inside in a vehicle width direction than the grip extension (60) as seen in a plan view.

Further, in the above configuration, the front side fixation portion (61) defining a lower portion of the opening (65) may be covered with a cover (39) from a side.

Further, in the above configuration, the front side fixation portion (61) may include a base (61a) to which the grip extension (60) and the coupler (62) are connected, and the base (61a) may protrude further toward the outside in the vehicle width direction than a lower end of the opening (65).

Further, in the above configuration, the cover (39) may have an upper portion extending toward the inside in the vehicle width direction from an upper side ridge (39b) as a boundary, and the base (61a) may extend longitudinally along the upper side ridge (39b) as seen in the side view of the vehicle.

Further, in the above configuration, the grab rail (50) may include a rear side fixation portion (56) placed to attach a rear portion of the grab rail (50) to the body frame (10), and the rear side fixation portion (56), the coupler (62) and at least a part of the grip extension (60) may be placed approximately parallel to one another as seen in the side view of the vehicle.

Further, in the above configuration, the front side fixation portion (61) and the rear side fixation portion (56) may extend rearward from the body frame (10). The front side fixation portion (61) may be fastened to the body frame (10) through a front side fastening portion (61c) that may be placed in a front end of the front side fixation portion (61). The rear side fixation portion (56) may be fastened to the body frame (10) through a rear side fastening portion (56a) that may be placed in a front end of the rear side fixation portion (56).

Further, in the above configuration, the grip extension (60), the front side fixation portion (61) and the coupler (62) may be integrally formed as a cast, and the grip (51) may be a pipe material and may be joined to a rear end of the grip extension (60).

Further, in the above configuration, the opening (65) may have a ridge (65b) extending all around an inner peripheral face (65a) of the opening (65), the ridge (65b) being in a midpoint in a depth direction of the opening (65). The inner peripheral face (65a) may be inclined such that the opening (65) gradually increases in inner diameter from the ridge (65b) toward both outer sides in the depth direction of the opening (65).

Further, in the above configuration, the grip extension (60) may include a prolonged portion (60a) that extends forward from the grip (51), and a downward prolonged portion (60b) that extends downward from the prolonged portion (60a). The opening (65) may be formed by using the downward prolonged portion (60b) and the coupler (62) to couple vertically the prolonged portion (60a) and the front side fixation portion (61) to each other.

Advantageous Effects of Invention

The grab rail of the saddle riding vehicle is fixed to the rear portion of the body frame. The grab rail includes the grip, the grip extension, the front side fixation portion and the coupler. The grip extends in the vehicle longitudinal direction. The grip extension extends downward from the front end of the grip. The front side fixation portion is connected to the lower end of the grip extension, and is attached to the body frame. The coupler couples the grip extension and the front side fixation portion to each other. The grab rail includes the luggage hook that is formed by the opening. The opening is defined by the grip extension, the front side fixation portion and the coupler.

With the configuration, the luggage hook is formed by the opening, and the opening is closed by being defined by the grip extension, the front side fixation portion and the coupler which couples the grip extension and the front side fixation portion to each other. Because of this, the fixing item engaged in the luggage hook does not easily fall out of the luggage hook, and thus the fixing item can be satisfactorily secured to the luggage hook.

In the above configuration, further, the coupler may be situated further inside in the vehicle width direction than the grip extension as seen in a plan view.

With the configuration, because the coupler is offset from the grip extension to the inside in the vehicle width direction, this facilitates engaging of the fixing item in the opening. Further, the luggage hook can be placed in a compact manner in the vehicle width direction.

In the above configuration, further, the front side fixation portion, which defines the lower portion of the opening, may be covered with the cover from a side.

With the configuration, because the front side fixation portion is hidden by being covered with the cover, good outward appearance of the grab rail is provided.

In the above configuration, further, the front side fixation portion may include the base to which the grip extension and the coupler are connected, and the base may protrude further toward the outside in the vehicle width direction than the lower portion of the opening.

With the configuration, the fixing item can be received by the base, and thus the deviation of the fixing item can be inhibited.

In the above configuration, further, the upper portion of the cover may extend toward the inside in the vehicle width direction from the upper side ridge as a boundary. The base may extend longitudinally along the upper side ridge as seen in the side view of the vehicle.

With the configuration, the fixing item can be received by the upper side ridge. Thus, the deviation of the fixing item can be inhibited, so that the fixing item can be inhibited from strongly hitting the cover.

In the above configuration, moreover, the rear side fixation portion may be placed to attach the rear portion of the grab rail to the body frame. The rear side fixation portion, the coupler, and at least a part of the grip extension may be placed approximately parallel to one another as seen in the side view of the vehicle.

With the configuration, because the rear side fixation portion, the coupler, and at least a part of the grip extension are approximately parallel to one another, the grab rail has a good outward appearance.

In the above configuration, further, the front side fixation portion and the rear side fixation portion may extend rearward from the body frame. The front side fastening portion through which the front side fixation portion is fastened to the body frame may be placed in the front end of the front side fixation portion. The rear side fastening portion through which the rear side fixation portion is fastened to the body frame may be placed in the front end of the rear side fixation portion.

With the configuration, because the grab rail extends rearward with respect to the body frame by virtue of the front side fixation portion and the rear side fixation portion, a space can be ensured in the front of the grab rail.

In the above configuration, further, the grip extension, the front side fixation portion and the coupler may be integrally formed as a cast. The grip may be a pipe material and may be joined to the rear end of the grip extension.

With the configuration, the opening can be readily formed by casing. Further, because the grip, which is joined to the rear end of the grip extension, is a pipe material, the weight of the grab rail can be reduced.

In the above configuration, further, the opening may have the ridge extending all around an inner peripheral face of the opening, the ridge being in a midpoint in the depth direction of the opening. The inner peripheral face may be inclined such that the opening gradually increases in inner diameter from the ridge toward both outer sides in the depth direction of the opening.

With the configuration, the opening is readily formed by casting.

In the above configuration, further, the grip extension may include: the prolonged portion that extends forward from the grip; and the downward prolonged portion that extends downward from the prolonged portion. The opening may be formed by using the downward prolonged portion and the coupler to couple vertically the prolonged portion and the front side fixation portion to each other.

With the configuration, the size of the opening can be increased in the longitudinal direction, so that the fixing item is easily secured to the luggage hook.

BRIEF DESCRIPTION OF INVENTION

DESCRIPTION OF EMBODIMENTS

Embodiments according to the present invention will now be described with reference to the accompanying drawings. It is noted that, throughout the description, words for directions such as front, rear, left, right, upward and downward are used in conformity with directions with respect to the vehicle body unless otherwise stated. Also, in each drawing, a reference sign FR denotes the front of the vehicle body, a reference sign UP denotes the upper side of the vehicle body and a reference sign LH denotes the left of the vehicle body.

Figure 1:
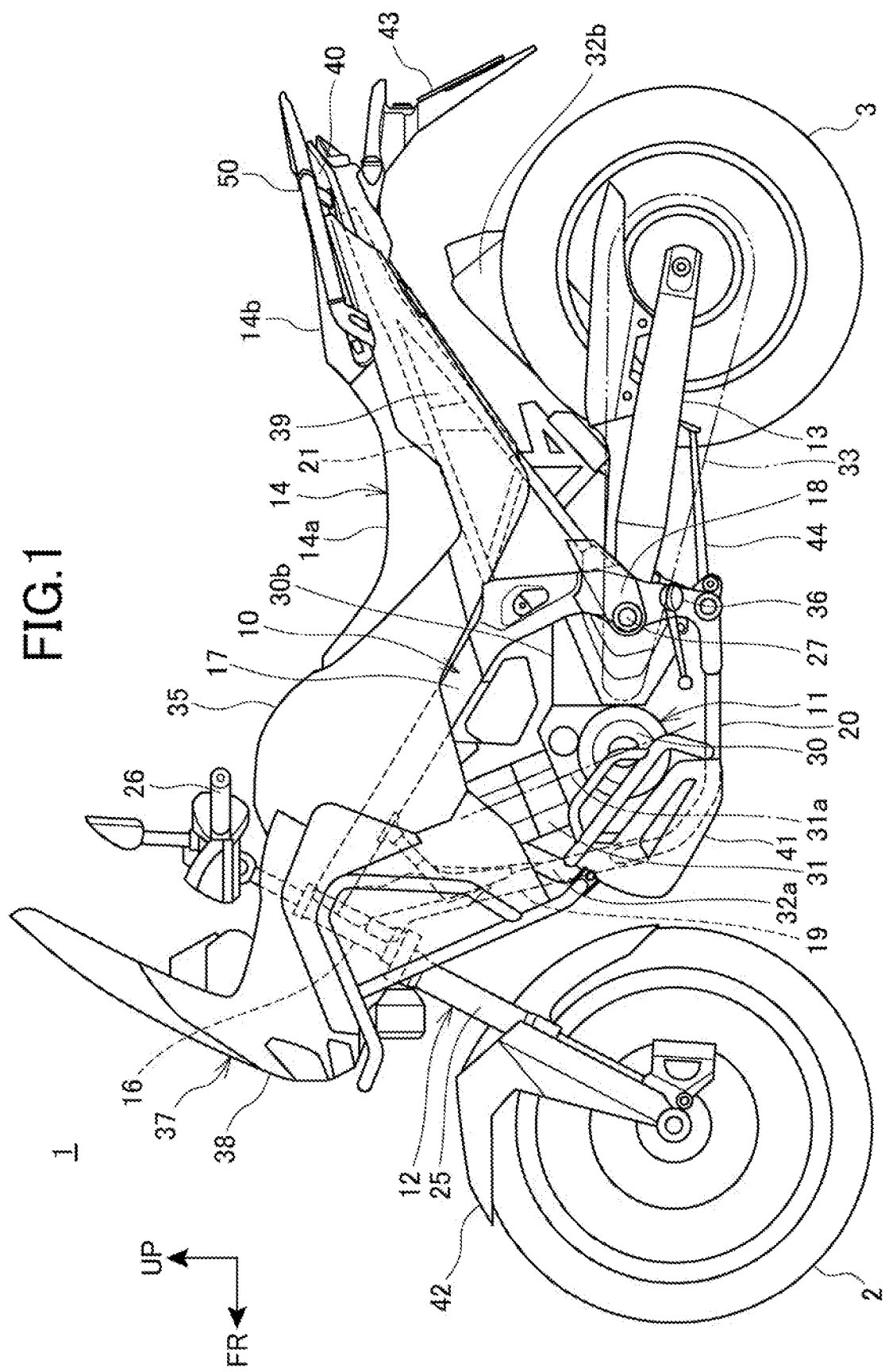
FIG. 1 is a left side view of a motorcycle according to an embodiment of the present invention.

FIG. 1 is a left side view of a motorcycle 1 according to an embodiment of the present invention.

The motorcycle 1 is a vehicle including: an engine 11 that acts as a power unit and is supported by a body frame 10; a steering system 12 that steerably supports a front wheel 2, the steering system 12 being steerably supported at a front end of the body frame 10; and a swing arm 13 that supports a rear wheel 3, the swing arm 13 being mounted in a rear portion of the body frame 10.

The motorcycle 1 is a saddle riding vehicle on which an occupant sits astride a seat 14, and the seat 14 is mounted above the rear portion of the body frame 10.

The body frame 10 includes a head pipe 16, a pair of left and right main frames 17, a pair of left and right pivot frames 18, a down frame 19, a pair of left and right lower frames 20, and a pair of left and right seat frames 21.

Specifically, the head pipe 16 is placed at the front end of the body frame 10, and is situated at the center of the vehicle width.

The left and right main frames 17 extend rearward while being inclined downwardly toward the rear from the head pipe 16.

The left and right pivot frames 18 extend downward from rear ends of the main frames 17.

The single down frame 19 extends downward from a position downward of the main frames 17 on the head pipe 16, and the down frame 19 is situated at the center of the vehicle width.

The left and right lower frames 20 branch laterally from the lower end of the down frame 19, and the lower frames 20 extend respectively rearward to be connected to the lower ends of the pivot frames 18.

The left and right seat frames 21 extend upwardly toward the rear from upper portions of the respective pivot frames 18.

The steering system 12 includes a pair of left and right front forks 25 and a handlebar 26 that is attached to upper ends of the front forks 25, the left and right front forks 25 being steerably mounted through a steering shat (not shown) which is journaled on the head pipe 16. A front wheel 2 is journaled at lower ends of the front forks 25.

The swing arm 13 has a front end journaled on a pivot shaft 27 which couples the left and right pivot frames 18 to each other in the vehicle width direction, so that the swing arm 13 pivots vertically about the pivot shaft 27. A rear wheel 3 is journaled at a rear end of the swing arm 13.

As viewed in the side view of the vehicle, the engine 11 is placed between the main frames 17 and the lower frames 20 and also between the down frame 19 and the pivot frames 18 so that the engine 11 is supported by the body frame 10.

The engine 11 includes a crankcase 30 and a cylinder section 31. The crankcase 30 supports a crankshaft (not shown) which extends horizontally in the vehicle width direction (left-right direction). The cylinder section 31 extends upward from a front portion of the crankcase 30. A cylinder axis 31a of the cylinder section 31 tilts forward from a vertical line.

An intake device (not shown) of the engine 11 is connected to an intake port in a rear face of the cylinder section 31.

An exhaust device of the engine 11 includes an exhaust pipe 32a and a muffler 32b. The exhaust pipe 32a is connected to an exhaust port in a front face of the cylinder section 31, and the muffler 32b is connected to a downstream end of the exhaust pipe 32a.

The exhaust pipe 32a extends downward from the foregoing exhaust port, and then extends rearward through under the engine 11. The muffler 32b is placed laterally outer side of the rear wheel 3.

A rear portion of the crankcase 30 serves as a transmission casing 30b in which a transmission is held. The output of the engine 11 is transmitted to the rear wheel 3 through a drive chain 33 which connects the rear wheel 3 and an output shaft of the foregoing transmission.

The seat 14 is supported from below by the seat frames 21. The seat 14 integrally includes a front seat 14a on which a rider sits, and a rear seat 14b on which a pillion passenger sits.

A fuel tank 35 is placed between the head pipe 16 and the seat 14 and the fuel tank 35 is supported above the engine 11 by the main frames 17.

A pair of left and right steps 36 on which the rider rests his/her feet is mounted at lower ends of the pivot frames 18.

A grab rail 50, which is to be grasped by the pillion passenger on the rear seat 14b, is placed rearward of the front seat 14a.

The motorcycle 1 includes a body cover 37 covering the vehicle body including the body frame 10, the engine 11 and the like. The body cover 37 includes a front cowl 38, a rear side cover 39 (cover), a tail cover 40, and an under cover 41. The front cowl 38 covers an upper portion of the steering system 12 and the head pipe 16 from the front and sides. The rear side cover 39 (cover) is located downward of the seat 14 to cover the seat frames 21. The tail cover 40 covers an area rearward of the seat 14 from above. The under cover 41 covers a lower portion of the engine 11 from the front.

The motorcycle 1 also includes: a front fender 42 that covers the front wheel 2 from above; a rear fender 43 that covers the rear wheel 3 from above; and a stand 44.

Figure 2:
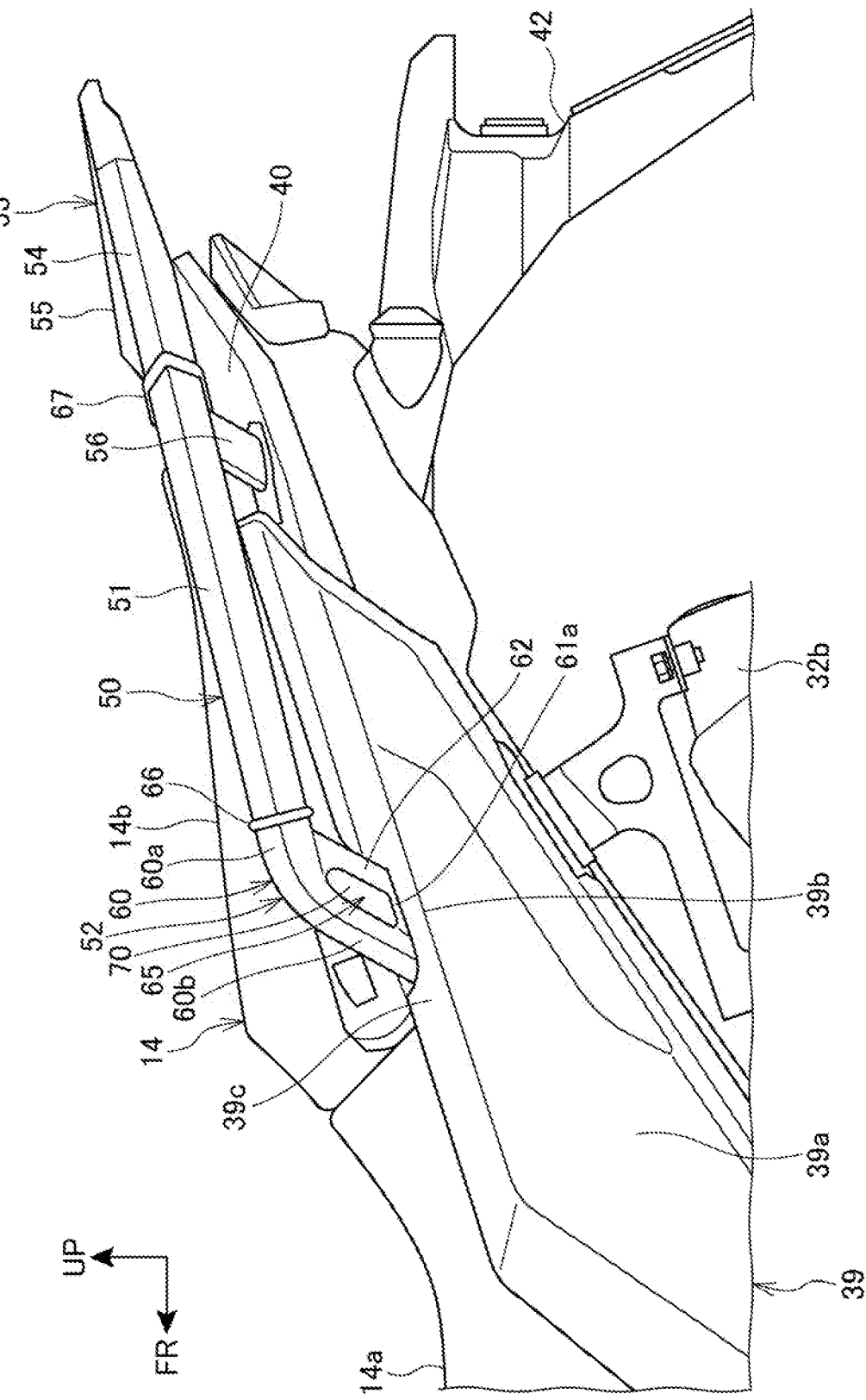
FIG. 2 is a left side view of a rear portion of the motorcycle.
Figure 3:
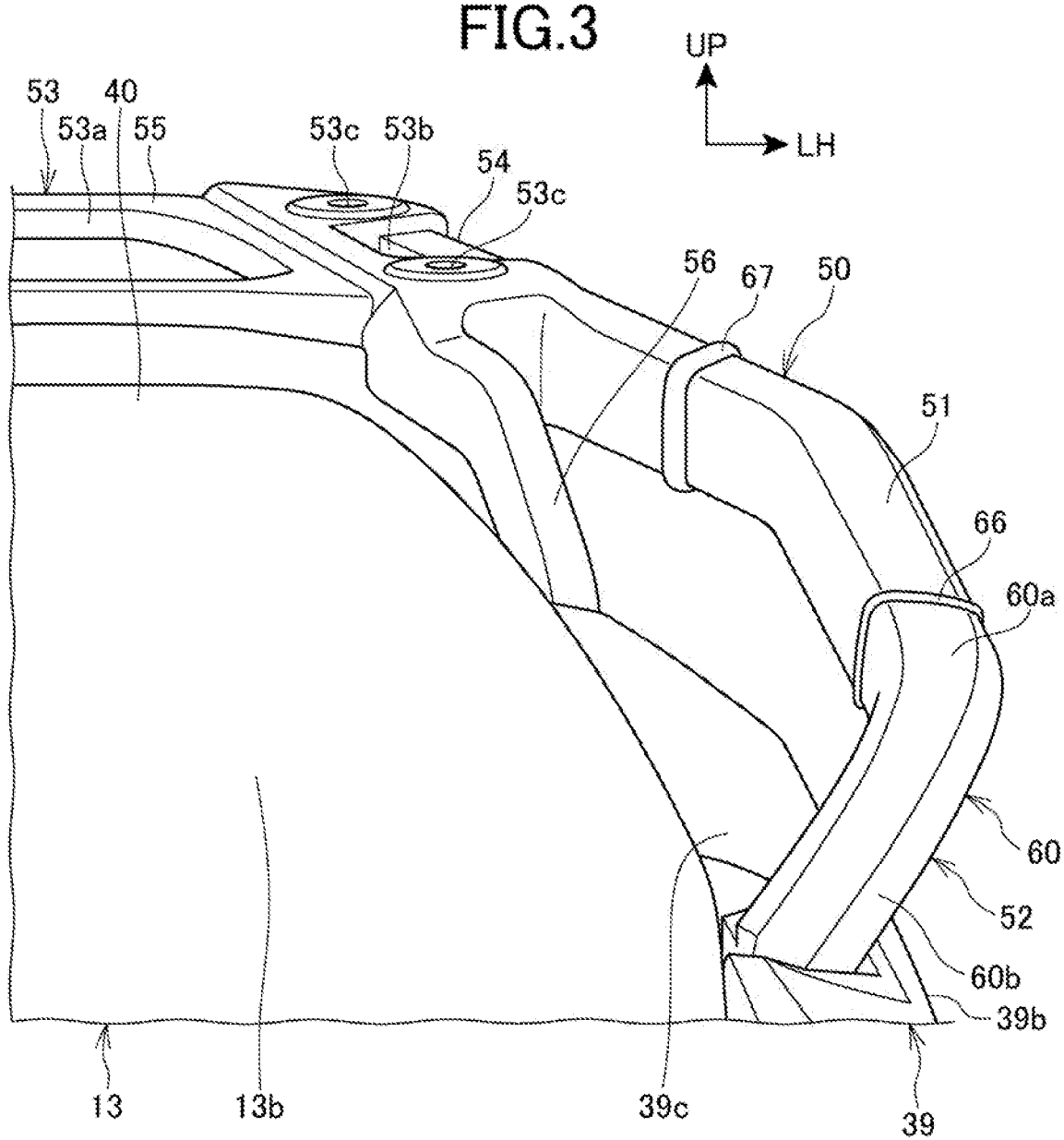
FIG. 3 is a diagram of the surroundings of a grab rail when viewed from the front.
Figure 4:
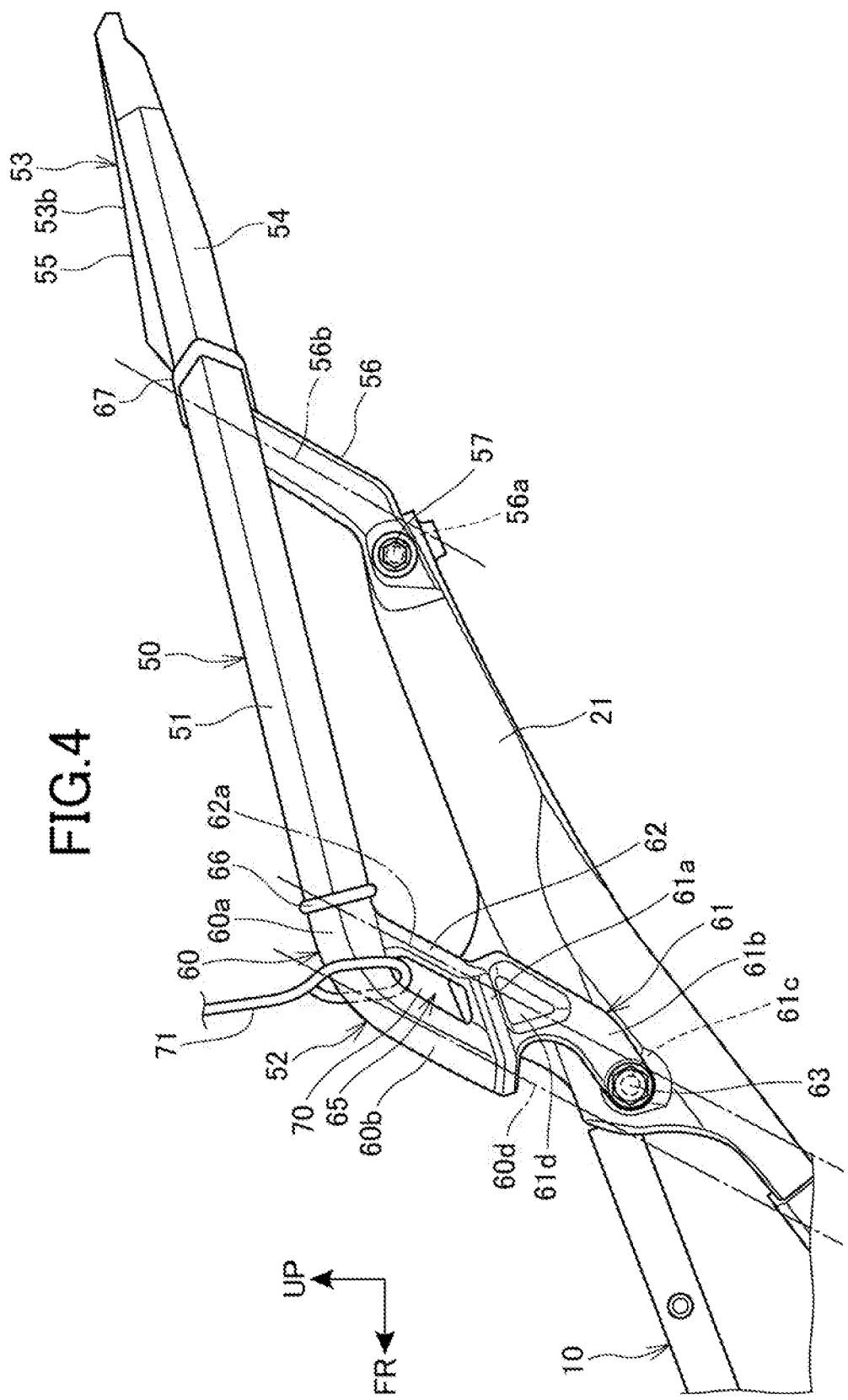
FIG. 4 is a left side view illustrating the mounted condition of the grab rail to the body frame.
Figure 5:
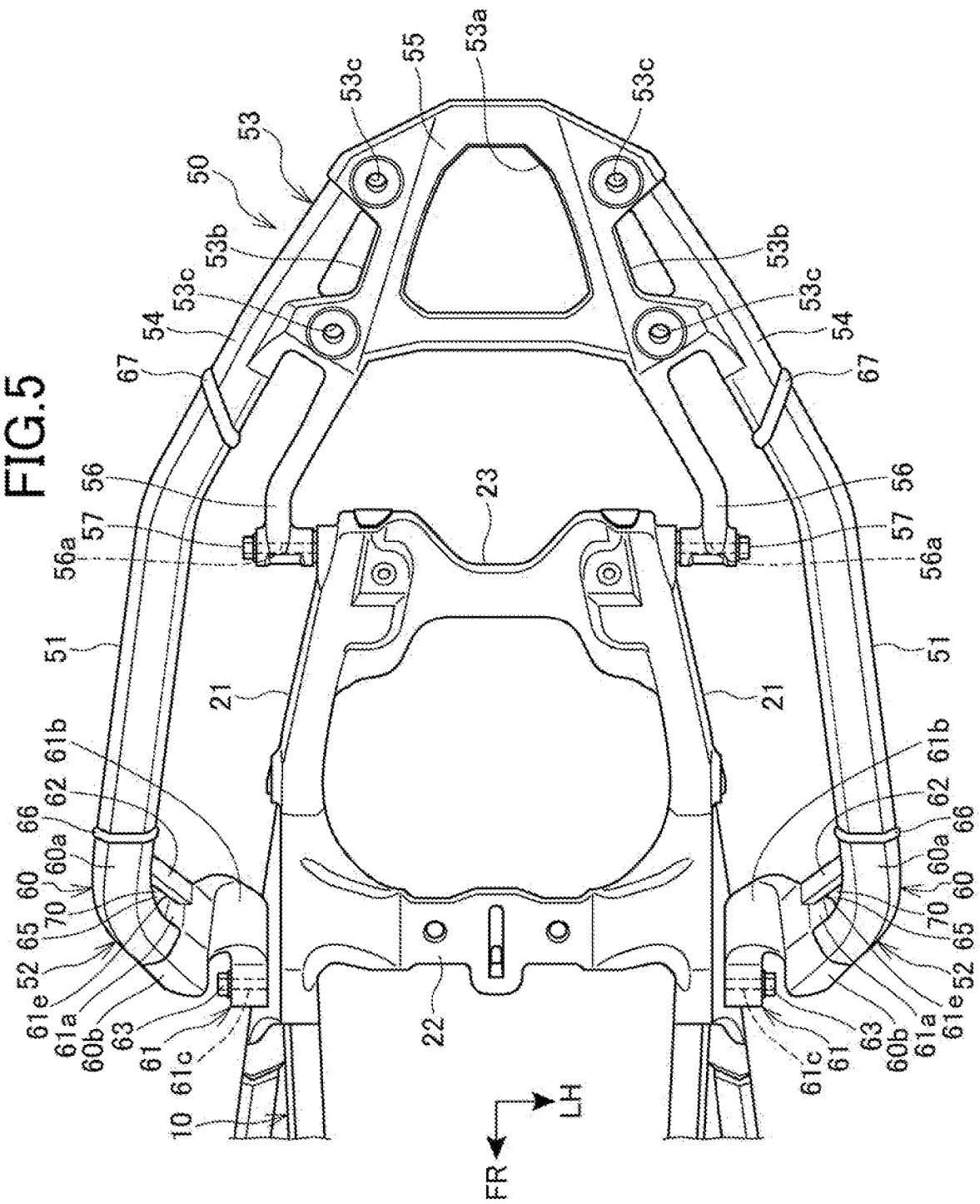
FIG. 5 is a plan view of the mounted condition of the grab rail to the body frame when viewed from above.

FIG. 2 is a left side view of a rear portion of the motorcycle 1. FIG. 3 is a diagram of the surroundings of the grab rail 50 when viewed from the front. FIG. 4 is a left side view illustrating the mounted condition of the grab rail 50 to the body frame 10. FIG. 5 is a plan view of the mounted condition of the grab rail 50 to the body frame 10 when viewed from above. Here, FIG. 3 illustrates only a portion of the left side of the motorcycle 1.

Referring to FIG. 2 to FIG. 5, the grab rail 50 integrally includes a pair of left and right grips 51, a pair of left and right front end portions 52 and a luggage carrier 53. The left and right grips 51 extend in the vehicle longitudinal direction. The left and right front end portions 52 are placed at front ends of the left and right grips 51. The luggage carrier 53 is placed at rear ends of the left and right grips 51.

The grab rail 50 is placed approximately bilaterally symmetric with respect to the center position of the vehicle width.

The grab rail 50 is secured to the left and right seat frames 21.

Each of the grips 51 is a rod-shaped member elongated in the vehicle longitudinal direction. The grip 51 is a hollow pipe having an empty space inside.

The pair of left and right grips 51 is placed laterally outer sides of the rear seat 14b, and is placed in a position inclined upwardly toward the rear so as to follow the rear seat 14b as viewed in the side view of the vehicle. The grips 51 overlap the side faces of the rear seat 14b from the outside as seen in the side view of the vehicle.

The luggage carrier 53 couples the rear ends of the left and right grips 51 to each other in the vehicle width direction.

The luggage carrier 53 includes a pair of left and right rod-shaped portions 54, a plate-shaped portion 55 and a pair of left and right rear side fixation portions 56. The left and right rod-shaped portions 54 extend rearward from the rear ends of the respective grips 51. The plate-shaped portion 55 couples the left and right rod-shaped portions 54 to each other in the vehicle width direction. The left and right rear side fixation portions 56 extend from the front end of the plate-shaped portion 55 in an obliquely forward and downward direction.

The luggage carrier 53 includes a lightening hole 53a formed in a laterally central portion of the plate-shaped portion 55. The luggage carrier 53 also includes a pair of rear openings 53b located respectively leftward and rightward of the lightening hole 53a, the rear openings 53b passing vertically through the luggage carrier 53.

The luggage carrier 53 includes a plurality of fixing holes 53c passing vertically through the plate-shaped portion 55. For more details, a pair of fixing holes 53c is located forward and rearward of the rear opening 53b on the left side, while another pair of fixing holes 53c is located forward and rearward of the rear opening 53b on the right side.

The upper surface of the luggage carrier 53 can be loaded thereon with a storage box (not shown). The storage box is fastened to the luggage carrier 53 with fixtures (not shown) which is inserted through the fixing holes 53c.

Each of the rear side fixation portions 56 has an arm shape extending from a left/right end of the front edge of the plate-shaped portion 55 to a point forward and downward of the corresponding rear end of the grip 51. The left and right rear side fixation portions 56 are placed further inside in the vehicle width direction than the left and right grips 51.

In the front ends of the rear side fixation portions 56, rear side fastening portions 56a are respectively placed and pass through the rear side fixation portions 56 in the vehicle width direction. Fasteners 57 are inserted respectively through the left and right rear side fastening portions 56a from the outside in the vehicle width direction in order to fasten the rear portion of the grab rail 50 to the seat frames 21.

Figure 6:
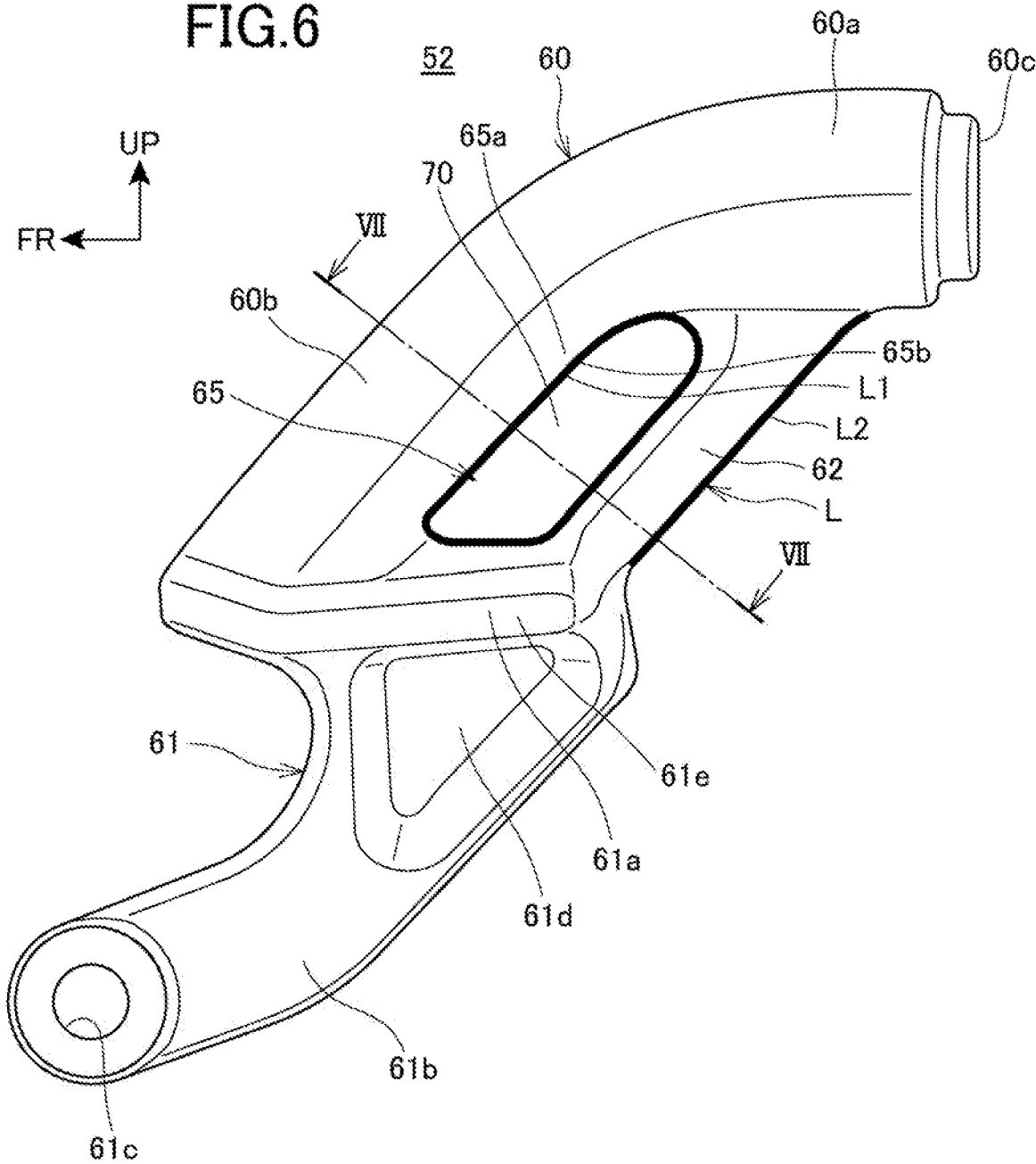
FIG. 6 is a left side view of a front end portion on the left side in the grab rail.

FIG. 6 is a left side view of the front end portion 52 on the left side in the grab rail 50. Because of the approximate left-right symmetry of the left and right front end portions 52, a description will now be given with reference to the front end portion 52 on the left side.

Referring to FIG. 2 to FIG. 6, the front end portion 52 includes a grip extension 60, a front side fixation portion 61 and a coupler 62. The grip extension 60 extends downwardly toward the front from the front end of the grip 51. The front side fixation portion 61 is connected to a lower end of the grip extension 60, and is attached to the body frame 10. The coupler 62 couples the grip extension 60 and the front side fixation portion 61 to each other.

The grip extension 60 includes a prolonged portion 60a and a downward prolonged portion 60b. The prolonged portion 60a extends downwardly toward the front so as to extend along the extension line in the axis direction of the grip 51. The downward prolonged portion 60b extends downwardly toward the front at a greater inclination downward toward the front than that of the prolonged portion 60a. A rearward protruding protrusion 60c is placed on a rear face of the prolonged portion 60a.

The front side fixation portion 61 includes a base 61a and an arm 61b. The base 61a is connected to a lower end of the downward prolonged portion 60b of the grip extension 60. The arm 61b extends downwardly toward the front from the base 61a.

The base 61a extends rearward from the lower end of the downward prolonged portion 60b. The base 61a extends longitudinally in approximate parallel to the prolonged portion 60a of the grip extension 60.

The arm 61b extends downwardly toward the front from the lower face of the base 61a. A front side fastening portion 61c is formed in a front end of the arm 61b, and the front side fastening portion 61c passes though the arm 61b in the vehicle width direction.

A fastener 63 is inserted through the front side fastening portion 61c from the outside in the vehicle width direction in order to fasten the front portion of the grab rail 50 to the seat frame 21. The front side fastening portion 61c is situated forward of and also downward of the lower end of the downward prolonged portion 60b.

The coupler 62 extends upwardly toward the rear from a rear end of the base 61a of the front side fixation portion 61, and the coupler 62 is connected to a rear portion of the prolonged portion 60a of the grip extension 60. The coupler 62 is located at a distance rearward form the downward prolonged portion 60b of the grip extension 60, and in that location, the coupler 62 vertically extends approximately parallel to the downward prolonged portion 60b. The coupler 62 is a rod-shaped portion with a smaller outer diameter than that of the downward prolonged portion 60b. The connection between the grip extension 60 and the front side fixation portion 61 is reinforced by the coupler 62.

As illustrated in FIG. 5, when viewed from above, the downward prolonged portion 60b and the coupler 62 are inclined such that the downward prolonged portion 60b and the coupler 62 are located further inside in the vehicle width direction as they extend downward from the prolonged portion 60a.

In other words, the downward prolonged portion 60b and the coupler 62 are situated further inside in the vehicle width direction than the prolonged portion 60a of the grip extension 60.

The front end portion 52 includes an opening 65 passing through the front end portion 52 in the vehicle width direction. The opening 65 is defied by the grip extension 60, the front side fixation portion 61 and the coupler 62.

Because the downward prolonged portion 60b and the coupler 62 are inclined toward the inside in the vehicle width direction, the opening 65 is also inclined such that the opening 65 is located further inside in the vehicle width direction as the opening 65 extends downward. Thus, in FIG. 5 when viewed from above, the opening 65 passes vertically through the front end portion 52.

As seen in the side view of the vehicle, the opening 65 extends vertically in a rearward tilt position. The opening 65 has an approximately rectangular shape which is longer in the vertical direction than the longitudinal direction.

In a site situated immediately underneath the opening 65 in the arm 61b of the front side fixation portion 61, the outside face of the arm 61b is dented toward the inside in the vehicle width direction to form a lightening portion 61d.

Figure 7:
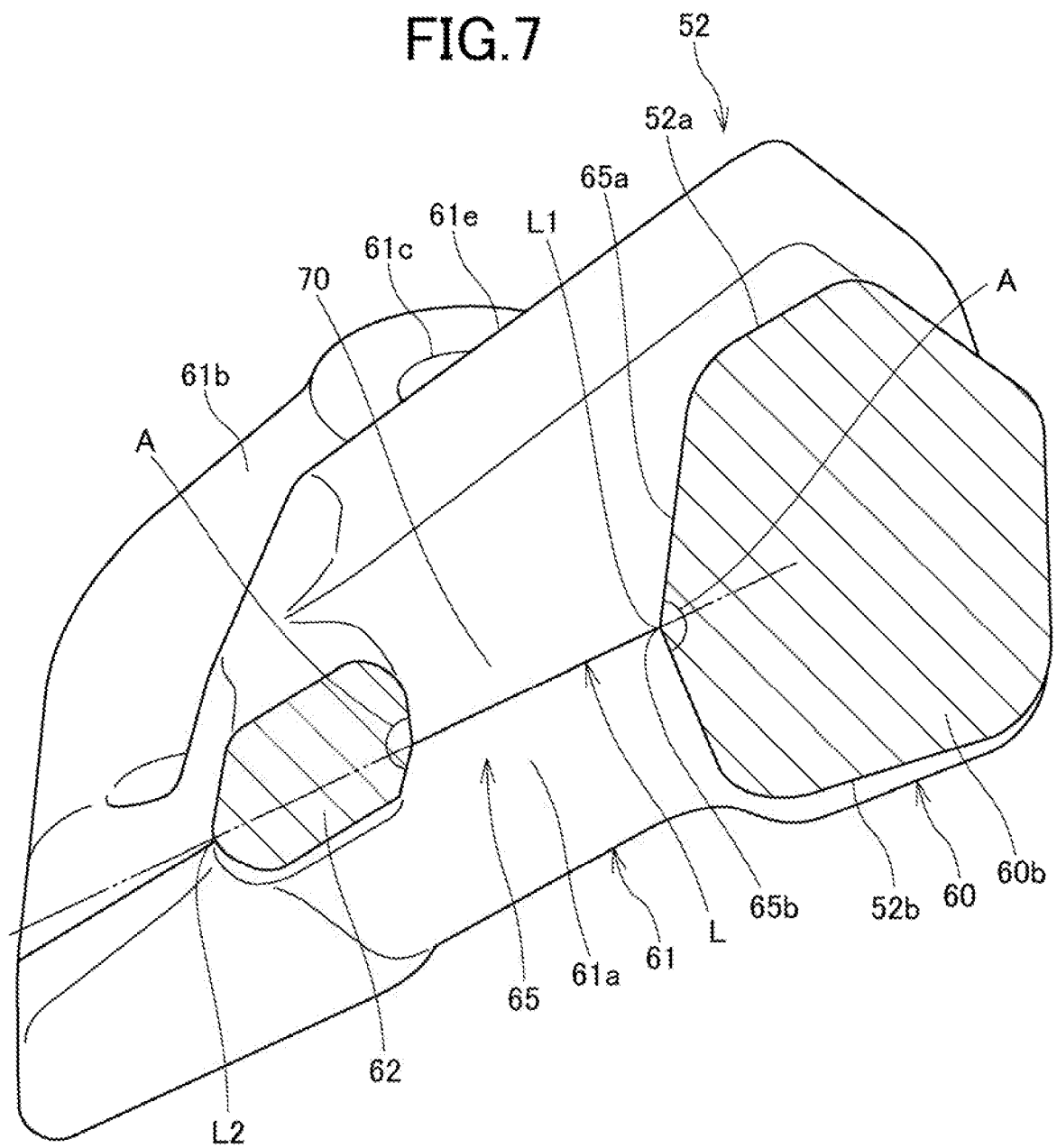
FIG. 7 is a view of section VII-VII of FIG. 6.

FIG. 7 is a view of section VII-VII of FIG. 6.

For the front end portion 52 of the grab rail 50, the grip extension 60, the front side fixation portion 61 and the coupler 62 are formed integrally together by casting.

The casting process for producing the front end portion 52 is a gravity casting process using a mold, for example.

The front end portion 52 is cast by use of a pair of separated left and right molds. FIG. 7 shows a parting line L between the molds when the front end portion 52 is cast. The parting line L is a line along which the front end portion 52 is divided into two in the vehicle width direction. Specifically, an outside portion 52a in the vehicle width direction of the front end portion 52 is molded by one of the pair of molds, and an inside portion 52b in the vehicle width direction of the front end portion 52 is molded by the other of the pair of molds.

The opening 65 is formed in the casting process of the front end portion 52.

Referring to FIG. 6 and FIG. 7, the opening 65 has a ridge 65b extending all around an inner peripheral face 65a of the opening 65, the ridge 65b being in a midpoint in the depth direction of the opening 65.

The inner peripheral face 65a is inclined such that the opening 65 gradually increases in inner diameter from the ridge 65b toward both outer sides in the depth direction of the opening 65. In short, the opening 65 has a smallest inner diameter at the ridge 65b.

The parting line L has a parting line L1 on the opening 65 and a parting line L2 on a rear face of the coupler 62.

For more details, the parting line L1 on the opening 65 coincides with the ridge 65b. Thus, the front end portion 52 can be readily removed from the molds in the casting process.

The parting line L1 and the parting line L2 on the rear face of the coupler 62 are in approximately the same plane. This enables achievement of a simple shape of molds, and in turn the creation of the molds can be facilitated.

For the luggage carrier 53 of the grab rail 50, the rod-shaped portions 54, the plate-shaped portion 55 and the rear side fixation portions 56 are formed integrally together by casting. The casting process for producing the luggage carrier 53 is a gravity casting process using a mold, for example.

Each grip 51 is a pipe material formed through an extrusion process, for example.

That is, the grab rail 50 is fabricated by coupling the front end portions 52 and the luggage carrier 53 to the front ends and the rear ends of the pipe-shaped grips 51, the front end portions 52 and the luggage carrier 53 being produced by casting.

For more details, each front end portion 52 is joined to the grip 51 by a weld bead 66 which runs all around the front end of the grip 51, with the protrusion 60c (FIG. 6) being fitted to the front end of the grip 51. Also, in the luggage carrier 53, the front end of each rod-shaped portion 54 is joined to the grip 51 by a weld bead 67 which runs all around the rear end of the grip 51.

Here, the grab rail 50 is made of metal. As an example, the grip 51 is a pipe material made of an aluminum alloy. Further, as an example, the front end portion 52 and the luggage carrier 53 are aluminum alloy casts. In the embodiment, because the grab rail 50 is made of metal, the grab rail 50 gives a metallic appearance, and in turn the outward appearance is good. Further, because the grip 51 is a pipe material, the lightweight grab rail 50 can be achieved even in the configuration with the metal-made grab rail 50. Moreover, because the front end portion 52 and the luggage carrier 53 are casts, the degree of freedom in strength and design can be increased.

Referring to FIG. 4 and FIG. 5, the grab rail 50 has the front portion fastened to the outside faces of the seat frames 21 with fasteners 63 which are inserted through front side fastening portions 61c of the front side fixation portions 61. The grab rail 50 also has the rear portion fastened to the outside faces of the seat frames 21 with the fasteners 57 which are inserted through the rear side fastening portions 56a of the rear side fixation portions 56.

The body frame 10 includes: a rear-portion cross member 22 that links the rear portions of the left and right seat frames 21 to each other in the vehicle width direction; and a rear-end cross member 23 that links the rear ends of the left and right seat frames 21 to each other in the vehicle width direction.

The fasteners 63 are located near the rear-portion cross member 22, while the fasteners 57 are located near the rear-end cross member 23.

Referring to FIG. 4, as seen in the side view of the vehicle, the front side fixation portion 61 extends rearward while being inclined upwardly toward the rear from the fastener 63 which is installed in the seat frame 21. And, the rear side fixation portion 56 extends rearward while being inclined upwardly toward the rear from the fastener 57 which is installed in the seat frame 21. That is, the grab rail 50 is offset as a whole to the rearward side from the seat 14, because the front side fixation portion 61 and the rear side fixation portion 56 extend rearward from the seat frame 21. Therefore, an ample space for the seat 14 forward of the grab rail 50 can be ensured to increase passenger comfort.

As illustrated in FIG. 4, further, the rear side fixation portion 56, the coupler 62, and the downward prolonged portion 60b which is a part of the grip extension 60, extend upwardly to the rear in approximate parallel to one another as seen in the side view of the vehicle. That is, an axis 56b of the rear side fixation portion 56, an axis 62a of the coupler 62, and an axis 60d of the downward prolonged portion 60b are approximately parallel to one another as seen in the side view of the vehicle. Thus, the grab rail 50 looks neat, and the grab rail 50 has a good outward appearance.

The pillion passenger sitting on the rear seat 14b, the rider walking the motorcycle 1, and the like grasp the grip/grips 51 mainly in order to catch hold of the vehicle body via the grab rail 50.

The opening 65 of the front end portion 52 of the grab rail 50 serves as a luggage hook 70 to which a fixing item 71 (FIG. 4) is able to be secured. The fixing item 71 is rope, a hook and/or the like, for example. The fixing item 71 is mounted to the grab rail 50 in order to hold the luggage placed on the luggage carrier 53 of the grab rail 50 and/or the rear seat 14b.

The opening 65 has a frame shape with the enclosed circumference of the peripheral edge of the opening 65. As illustrated in FIG. 4, the rope which is the fixing item 71 has a looped portion formed at an end of the rope, for example, and the rope is mounted to the grab rail 50 by passing the looped portion through the opening 65. Because the opening 65 has the frame shape with the enclosed circumference of the peripheral edge of the opening 65, the fixing item 71 does not easily come out of the opening 65.

As illustrated in FIG. 2, the base 61a of the front side fixation portion 61 defines the lower portion of the opening 65, and the base 61a is at least partially hidden by being covered outwardly from a side with the outer edge of the rear side cover 39. Therefore, the grab rail 50 looks neat, and the outward appearance is good. It is noted that an area above the upper end of the base 61a may be configured to be covered with the rear side cover 39 in order to allow a lower portion of the opening 65 to be hidden by the rear side cover 39.

As illustrated in FIG. 7, two planes intersect at the ridge 65b on an inner peripheral face 65a of the opening 65, and an angle A formed between the two planes is an obtuse angle. Therefore, the inner peripheral face 65a of the opening 65 can be prevented from coming into strong contact with the fixing item 71.

Referring to FIG. 5 to FIG. 7, the base 61a of the front side fixation portion 61 has an outer end 61e in the vehicle width direction, and the outer end 61e protrudes further toward the outside in the vehicle width direction than the lower end of the opening 65. The outer end 61e also protrudes further toward the outside in the vehicle width direction than the lower end of the coupler 62 and the lower end of the downward prolonged portion 60b. Therefore, if the fixing item 71 in the opening 65 is to about deviate downward, the fixing item 71 can be received by the outer end 61e, so that deviation of the fixing item 71 can be inhibited.

As illustrated in FIG. 2, the rear side cover 39 also includes a cover side-face 39a and a cover upper-face 39c. The cover side-face 39a covers the seat frame 21 from a side. The cover upper-face 39c extends upward and toward the inside in the vehicle width direction from an upper side ridge 39b of an upper edge of the cover side-face 39a.

As seen in the side view of the vehicle, the base 61a is situated above the upper side ridge 39b, and the base 61a extends parallel to the upper side ridge 39b in the longitudinal direction. Therefore, if the fixing item 71 is about to deviate downward from the opening 65, the fixing item 71 can be received by the cover upper-face 39c and the upper side ridge 39b. As a result, deviation of the fixing item 71 can be inhibited and thus the fixing item 71 can be inhibited from hitting the cover side-face 39a.

As described above, according to the embodiment to which the present invention is applied, the grab rail 50 of the motorcycle 1 is fixed to the rear portion of the body frame 10. The grab rail 50 includes the grip 51, the grip extension 60, the front side fixation portion 61 and the coupler 62. The grip 51 extends in the vehicle longitudinal direction. The grip extension 60 extends downward from the front end of the grip 51. The front side fixation portion 61 is connected to the lower end of the grip extension 60, and is attached to the body frame 10. The coupler 62 couples the grip extension 60 and the front side fixation portion 61 to each other. The grab rail 50 includes the luggage hook 70 that is formed by the opening 65. The opening 65 is defined by the grip extension 60, the front side fixation portion 61 and the coupler 62.

With the configuration, the luggage hook 70 is formed by the opening 65, and the opening 65 is closed by being defined by the grip extension 60, the front side fixation portion 61 and the coupler 62 which couples the grip extension 60 and the front side fixation portion 61 to each other. Because of this, the fixing item 71 engaged with the luggage hook 70 does not easily fall out of the luggage hook 70, and thus the fixing item 71 can be satisfactorily secured to the luggage hook 70.

Further, the coupler 62 is situated further inside in the vehicle width direction than the grip extension 60 as seen in a plan view.

With the configuration, because the coupler 62 is offset from the grip extension 60 to the inside in the vehicle width direction, the fixing item 71 is readily engaged in the opening 65. Further, the luggage hook 70 can be placed in a compact manner in the vehicle width direction.

Further, the front side fixation portion 61, which defines the lower portion of the opening 65, is covered with the rear side cover 39 from a side.

With the configuration, because the front side fixation portion 61 is hidden by being covered with the rear side cover 39, the outward appearance of the grab rail 50 is good.

Further, the front side fixation portion 61 includes the base 61a to which the grip extension 60 and the coupler 62 are connected, and the base 61a protrudes further toward the outside in the vehicle width direction than the lower portion of the opening 65.

With the configuration, the fixing item 71 can be received by the base 61a, and thus the deviation of the fixing item 71 can be inhibited.

Further, the upper portion of the rear side cover 39 extends toward the inside in the vehicle width direction from the upper side ridge 39b as a boundary, and the base 61a extends longitudinally along the upper side ridge 39b as seen in the side view of the vehicle.

With the configuration, the fixing item 71 can be received by the upper side ridge 39b. Thus, the deviation of the fixing item 71 can be inhibited, so that the fixing item 71 can be inhibited from strongly hitting the rear side cover 39.

Further, the rear side fixation portion 56 is placed to attach the rear portion of the grab rail 50 to the body frame 10, and the grip extension 60, the coupler 62 and the rear side fixation portion 56 are placed approximately parallel to one another as seen in the side view of the vehicle.

With the configuration, because the rear side fixation portion 56, the coupler 62, and the grip extension 60 which is a part of the downward prolonged portion 60b are approximately parallel to one another, the grab rail 50 has a good outward appearance.

Further, the front side fixation portion 61 and the rear side fixation portion 56 extend rearward from the body frame 10. The front side fastening portion 61c through which the front side fixation portion 61 is fastened to the body frame 10 is placed in the front end of the front side fixation portion 61. The rear side fastening portion 56a through which the rear side fixation portion 56 is fastened to the body frame 10 is placed in the front end of the rear side fixation portion 56.

With the configuration, because the grab rail 50 extends rearward with respect to the body frame 10 by virtue of the front side fixation portion 61 and the rear side fixation portion 56, a space is ensured in the front of the grab rail 50.

Further, the grip extension 60, the front side fixation portion 61 and the coupler 62 are integrally formed as a cast, and the grip 51 is a pipe material and is joined to the rear end of the grip extension 60.

With the configuration, the opening 65 can be readily formed by casing. Further, because the grip 51 joined to the rear end of the grip extension 60 is a pipe material, the weight of the grab rail 50 can be reduced.

Further, the opening 65 has the ridge 65b extending all around an inner peripheral face 65a of the opening 65, the ridge 65b being in a midpoint in the depth direction of the opening 65. The inner peripheral face 65a is inclined such that the opening 65 gradually increases in inner diameter from the ridge 65b toward both outer sides in the depth direction of the opening 65.

With the configuration, the opening 65 is readily formed by casting.

Further, the grip extension 60 includes: the prolonged portion 60a that extends forward from the grip 51; and the downward prolonged portion 60b that extends downward from the prolonged portion 60a. The opening 65 is formed by using the downward prolonged portion 60b and the coupler 62 to couple vertically the prolonged portion 60a and the front side fixation portion 61 to each other.

With the configuration, the size of the opening 65 can be increased in the longitudinal direction, so that the fixing item 71 is easily secured to the luggage hook 70.

It should be understood that the embodiment has been described to provide a merely illustrative embodiment to which the present invention is applied, and thus the present invention is not limited to the aforementioned embodiment.

In the aforementioned embodiment, at least a part (the downward prolonged portion 60b) of the grip extension 60 has been described as being approximately parallel to the coupler 62 and the opening 65 has been described as being rectangular as seen in the side view of the vehicle, but the present invention is not so limited. For example, the grip extension 60 may linearly extend downwardly toward the front from the front end of the grip 51 to be connected to the base 61a, so that the opening 65 may be formed in a triangular shape as seen in the side view of the vehicle.

Further, in the aforementioned embodiment, the grab rail 50 is formed by joining together the grip 51, the front end portion 52 and the luggage carrier 53 all of which are formed separately, but the present invention is not so limited. For example, even if the grip 51, the front end portion 52 and the luggage carrier 53 are integrally molded by casting or the like, a fixing item such as rope or the like is able to be satisfactorily secured to the luggage hook. That is, the grab rail 50 may be formed by integrally molding together the grip 51, the front end portion 52 and the luggage carrier 53, rather than by separately molding the grip 51, the front end portion 52 and the luggage carrier 53. In this case, the grab rail 50 may be integrally formed as one piece using an aluminum alloy, ferrous metal or resin materials, for example.

In the aforementioned embodiment, the motorcycle 1 has been described as an example of saddle riding vehicles, but the present invention is not limited to this. The present invention may be applied to a three-wheeled saddle riding vehicle having two front or rear wheels, and a saddle riding vehicle having four or more wheels.

REFERENCE SIGNS LIST

1 . . . Motorcycle (saddle riding vehicle)
10 . . . Body frame
39 . . . Rear side cover (cover)
39b . . . Upper side ridge
50 . . . Grab rail
51 . . . Grip
56 . . . Rear side fixation portion
56a . . . Rear side fastening portion
60 . . . Grip extension
60a . . . Prolonged portion
60b . . . Downward prolonged portion
61 . . . Front side fixation portion
61a . . . Base
51c . . . Front side fastening portion
62 . . . Coupler
65 . . . Opening
65a . . . Inner peripheral face
65b . . . Ridge
70 . . . Luggage hook

The invention claimed is:

1. A grab rail of a saddle riding vehicle, the grab rail being secured to a rear portion of a body frame,
wherein the grab rail includes:
a grip that extends in a vehicle longitudinal direction;
a grip extension that extends downward from a front end of the grip;
a front side fixation portion that is connected to a lower end of the grip extension and is attached to the body frame; and
a coupler that couples the grip extension and the front side fixation portion to each other,
the grab rail includes a luggage hook that is formed by an opening, and
the opening is defined by the grip extension, the front side fixation portion and the coupler,
the grip extension, the front side fixation portion and the coupler are integrally formed as a cast, and
the grip is a pipe material and is joined to a rear end of the grip extension.

2. The grab rail of the saddle riding vehicle according to claim 1, wherein the coupler is situated further inside in a vehicle width direction than the grip extension as seen in a plan view.

3. The grab rail of the saddle riding vehicle according to claim 1,
wherein the front side fixation portion defining a lower portion of the opening includes a base to which the grip extension and the coupler are connected, and
the base protrudes further toward an outside in a vehicle width direction than a lower end of the opening.

4. The grab rail of the saddle riding vehicle according to claim 1,
wherein the grab rail includes a rear side fixation portion placed to attach a rear portion of the grab rail to the body frame, and
the rear side fixation portion, the coupler and at least a part of the grip extension are placed approximately parallel to one another as seen in a side view of the vehicle.

5. The grab rail of the saddle riding vehicle according to claim 1,
wherein the opening has a ridge extending all around an inner peripheral face of the opening, the ridge being at a midpoint in a depth direction of the opening, and
the inner peripheral face is inclined such that the opening gradually increases in inner diameter from the ridge toward both outer sides in the depth direction of the opening.

6. The grab rail of the saddle riding vehicle according to claim 1,
wherein the grip extension includes a prolonged portion that extends forward from the grip, and a downward prolonged portion that extends downward from the prolonged portion, and
the opening is formed by using the downward prolonged portion and the coupler to couple vertically the prolonged portion and the front side fixation portion to each other.

7. A saddle riding vehicle comprising the grab rail according to claim 1 and a cover that covers the front side fixation portion from a side.

8. The saddle riding vehicle according to claim 7,
wherein the cover has an upper portion extending toward an inside in a vehicle width direction from an upper side ridge as a boundary, and
the base of the front side fixation portion extends longitudinally along the upper side ridge as seen in a side view of the vehicle.

9. The saddle riding vehicle according to claim 7,
wherein the front side fixation portion and the rear side fixation portion extend rearward from the body frame,
the front side fixation portion is fastened to the body frame through a front side fastening portion that is placed in a front end of the front side fixation portion, and
the rear side fixation portion is fastened to the body frame through a rear side fastening portion that is placed in a front end of the rear side fixation portion.

* * * * *